US005534589A

United States Patent [19]

Hager et al.

[11] Patent Number: 5,534,589
[45] Date of Patent: Jul. 9, 1996

[54] REPULPABLE PLASTIC FILMS

[75] Inventors: Patrick J. Hager; Richard J. Goetz, both of Woodbury, Minn.

[73] Assignee: Minnesota Mining and Manufacturing Company, St. Paul, Minn.

[21] Appl. No.: 238,226

[22] Filed: May 4, 1994

[51] Int. Cl.[6] .......................... C08G 63/48; C08G 63/91; C08L 29/04
[52] U.S. Cl. ................... 525/57; 525/58; 524/801; 428/402
[58] Field of Search .................. 525/57, 58; 521/139, 521/140, 146, 147, 149, 150; 428/402; 524/801

[56] References Cited

U.S. PATENT DOCUMENTS

| | | | |
|---|---|---|---|
| 3,705,659 | 12/1972 | Mackie | 215/1 C |
| 4,166,152 | 8/1979 | Baker et al. | 428/522 |
| 4,372,311 | 2/1983 | Potts | 128/287 |
| 4,495,318 | 1/1985 | Howard | 524/375 |
| 4,598,112 | 7/1986 | Howard | 524/78 |
| 4,620,988 | 11/1986 | Garschke et al. | 427/223 |
| 4,645,783 | 2/1987 | Kinoshita | 523/221 |
| 4,692,464 | 9/1987 | Skuballa et al. | 514/530 |
| 4,786,696 | 11/1988 | Bohnel | 526/88 |
| 4,810,763 | 3/1989 | Mallya et al. | 526/203 |
| 4,855,170 | 8/1989 | Darvell et al. | 428/40 |
| 5,118,750 | 6/1992 | Silver et al. | 524/462 |
| 5,200,247 | 4/1993 | Wu et al. | 428/131 |

FOREIGN PATENT DOCUMENTS 3544882 12/1985 Germany .

OTHER PUBLICATIONS

M. Acacia et al., Journal of Polymer Science, vol. 27 (1989) pp. 3521–3530.
M. Acacia et al., Angewandte Makromole Kular Chemie, vol. 132 (1985) pp. 81–89.
M. Acacia et al., Journal of Applied Polymer Science, vol. 39 (1990), p. 2027.

*Primary Examiner*—Paul R. Michl
*Assistant Examiner*—U. K. Rajguru
*Attorney, Agent, or Firm*—Gary L. Griswold; Walter N. Kirn; William J. Bond

[57] ABSTRACT

This invention relates to water dispersible polymeric films, to processes for the film preparation and materials for use in forming the water dispersible polymeric films.

22 Claims, No Drawings

REPULPABLE PLASTIC FILMS

BACKGROUND AND FIELD OF THE INVENTION

This invention relates to water dispersible polymeric films, to processes for the film preparation and materials for use in forming the water dispersible polymeric films.

In recent times, community, public and private organizational recycling of paper products has grown tremendously, including growth in the types and variety of papers subject to repulping, which is the primary form of paper recycling. However with the expansion of the nature and type of paper products subject to repulping operations problems have arisen from contamination of the pulp feedstream by materials which are not readily subject to repulping. These contaminants are often difficult to remove either before or during the repulping operation. For example, significant amounts of plastic films are used in conjunction with envelopes, paper mailings, magazine and newspaper inserts, and packaging, either as a packaging film or as a tape product applied to a package, or the like. Paper products used with these plastic films are generally not accepted by most recyclers, and entire lots of collected materials containing such plastic contaminants are sometimes rejected by the repulper as unprocessable hindering community attempts at reducing the need to landfill.

A potential solution to this problem would be by using water soluble or dispersible polymer films in applications that are most likely to cause problems with repulping of recycled materials. There are numerous commercially available water soluble or dispersible film forming polymers, the most common of which is polyvinyl alcohol, and the use of these water soluble polymer films would be acceptable in many applications. However, generally, these water soluble polymers are so sensitive to water that their use is limited, particularly in high humidity and high temperature locations. Suggested solutions to this water and humidity sensitivity problem include protecting the water soluble films with a thin surface layer, such as disclosed in U.S. Pat. No. 3,705,659 (which proposes using a thin, photodegradable, polyethylene film on both faces of a water soluble film); U.S. Pat. No. 4,372,311 (where a water soluble polymer is coated with a water-insoluble, biodegradable polymer); U.S. Pat. No. 5,200,247 (which blends in a alkanoyl polymer with polyvinyl alcohol, which allegedly improves water resistance of the water soluble film while enhancing biodegradability); and U.S. Pat. No. 4,692,494 (which blends in polyacrylic acid with polyvinyl alcohol to provide the water soluble film with more humidity resistance). The coated or coextruded films, while providing humidity and water resistance, can not be readily repulped. The above polymer blends solutions do not necessarily provide the amount of humidity resistance or moisture resistance required while also providing a repulpable film. There remains a distinct need for further options in providing a water dispersible or repulpable film product that is also more resistant to water than conventional water soluble polymer films. There is particularly a need for a repulpable film that disintegrates into small enough particles such that the particles do not cause problems when the pulp is formed into new paper stock.

SUMMARY OF THE INVENTION

The water dispersible materials of the invention are formed from novel film forming hydrophobic, polymeric, water insoluble, solvent insoluble and plastic microspheres, preferably having as an additional component a water soluble polymer as a matrix binder and/or modified by reaction with a hydrophilic moiety in the microsphere formation reaction or by subsequent grafting with a water soluble polymer. The film forming plastic microspheres are formed from dispersed monomers in the form of droplets in a liquid medium by known microsphere polymerization techniques into solid or hollow microspheres of from 1 to 300 microns average diameter. The microspheres are formed from a reaction of at least the following monomers:

(a) 70 to 100 parts of free radically polymerizable monomers polymerizable to a polymer having a Tg of at least 10° C.;

(b) 0 to 5 parts of a polar monomer copolymerizable with the monomer of element (a);

(c) 0 to 25 parts of a hydrophilizing agent of at least one hydrophilic oligomer or polymer having a degree of polymerization of at least 2, functionalized derivatives thereof and mixtures thereof, such that the hydrophilic oligomer or polymer can react with the microsphere monomers; and (d) 0.01 to 10 equivalent weight percent of a crosslinking agent.

The film forming microspheres can be formed into a self-supporting film or fiber from an aqueous suspension by coating or casting the suspension where the aqueous, or polar liquid phase, is preferably a solution of water soluble polymer having a solids concentration sufficient to provide a film or fiber of, by weight, 100 to 25 parts microspheres to 0 to 75 parts water soluble polymer. The cast or otherwise formed microsphere film or fiber is then dried into a solid coherent film or fiber.

In a preferred embodiment of the invention microspheres are prepared by suspension polymerization of an emulsion or dispersion of the free radically polymerizable monomers in droplet form (the liquid form of the microspheres prior to polymerization) in a continuous phase of an aqueous or polar solution of the water soluble polymer.

DETAILED DESCRIPTION OF THE INVENTION

The plastic polymeric solvent and water insoluble, crosslinked, solvent dispersible, polymeric microspheres are formed primarily from free radically polymerizable monomers preferably capable of forming homo- or co-polymers having glass transition temperatures or melt transition temperatures generally above 20° C. Solvent and water insoluble means that the microspheres are at least partially insoluble in solvent and/or water or are infusible. Suitable monomers or comonomers include vinyl esters, alkyl acrylates, alkyl methacrylates, styrenes and substituted styrenes, cyclic alkyl acrylates and methacrylates, aryl acrylates and methacrylates, or mixtures thereof. Vinyl esters suitable include vinyl neononanoate, vinyl pivalic acid ester, vinyl acetate, vinyl propionate, or vinyl neodecanoate. Acrylates and methacrylates can be used provided that they do not cause the resultant polymer to have a Tg or Tm or softening point of less than 10° C. Preferred are acrylates and methacrylates which will produce homopolymer or copolymer having glass transition temperatures higher than 0° C., preferably higher than 10° C. Suitable acrylates and methacrylates include terbutyl acrylate, isobornyl acrylate, butyl methacrylate, acrylonitrile, isononal acrylate, isodecyl acrylate, isodecyl methacrylate, sec-butyl acrylate, isoamyl acrylate, 2-methylbutyl acrylate, 4-methyl-2-pentyl acrylate, isodecyl acrylate, ethyl acrylate and mixtures thereof with vinyl esters, such as vinyl acetate and other suitable comonomers.

Styrene and substituted styrenes are suitable monomers used alone or in conjunction with the vinyl esters, acrylates, methacrylates or acrylics. Also useful as comonomers are other vinyl monomers such as vinyl benzene, divinyl benzene, N-i-octylacrylamide vinyl chloride and vinylidene chloride, which monomers can be used in conjunction with the vinyl ester, acrylate, methacrylate or acrylic monomers. Minor amounts of other comonomers known in the art can be employed, provided that the Tg of the copolymer stays within the desired range.

The polar monomers useful in the present invention are both somewhat oil-soluble and water soluble, resulting in a distribution of the polar monomer between the aqueous or polar phase and the oil phase. Representative examples of suitable polar monomers include, but are not limited to, those selected from the group consisting of acrylic acid, methacrylic acid, itaconic acid, crotonic acid, maleic acid, fumaric acid, sulfoethyl methacrylate, and ionic monomers such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(beta-methacryloxy-ethyl) ammonium propionate betaine, trimethylamine methacrylimide, 1,1-dimethyl-1-(2,3-dihydroxypropyl)amine methacrylimide, N-vinyl pyrrolidone, N-vinyl caprolactam, acrylamide, t-butyl acrylamide, dimethyl amino ethyl acrylamide, N-octyl acrylamide, mixtures thereof, and the like. Preferred polar monomers include those selected from the group consisting of monoolefinic monocarboxylic acids, monoolefinic dicarboxylic acids, acrylamides, N-substituted acrylamides, salts thereof, and mixtures thereof. Examples of such monomers include but are not limited to those selected from the group consisting of acrylic acid, sodium acrylate, N-vinyl pyrrolidone, and mixtures thereof.

The hydrophilizing agent or component preferable coreacts with the microsphere monomers and can act as a crosslinker. Free radically reactive hydrophilic oligomers(a polymer having a low number of repeating units, generally 2 to 20) and/or polymers(having more repeating units than an oligomer) useful according to the present invention include but are not limited to those selected from the group consisting of poly(alkylene oxides) such as poly(ethylene oxide), poly(vinyl methyl ether), poly(acrylamide), poly(n-vinylpyrrolidone), poly(vinyl alcohol), cellulose derivatives and mixtures thereof.

Preferred macromonomers include those selected from the group consisting of acrylate terminated poly(ethylene oxide), methacrylate terminated poly(ethylene oxide), methoxy poly(ethylene oxide) methacrylate, butoxy poly(ethylene oxide) methacrylate, p-vinyl benzyl terminated poly(ethylene oxide), acrylate terminated poly(ethylene glycol), methacrylate terminated poly(ethylene glycol), methoxy poly(ethylene glycol) methacrylate, butoxy poly(ethylene glycol) methacrylate, p-vinyl benzyl terminated poly(ethylene glycol), poly(ethylene oxide) diacrylate, poly(ethylene oxide) dimethacrylate, and mixture thereof. These functionalized materials are preferred because they are easily prepared through well-known ionic polymerization techniques and are also highly effective in providing grafted hydrophilic segments along free radically polymerized microsphere polymer backbones.

Preferred macromonomers also include those selected from the group consisting of p-vinyl benzyl terminated poly(n-vinyl pyrrolidone), p-vinyl benzyl terminated poly(acrylamide), methacrylate terminated poly(n-vinyl pyrrolidone), p-vinyl benzyl terminated poly(acrylamide), and mixtures thereof. These macromonomers may be prepared through the esterification reaction of a carboxy terminated n-vinyl pyrrolidone or acrylamide, beta-mercaptopropionic acid chain transfer agent, and chloromethyl styrene or methacryloyl chloride as described in a series of papers by M. Acacia et al. [*Angew, Makromol. Chem.*, 132, 81 (1985); *J. Appl. Polym. Sci.*, 39, 2027 (1990); *J. Polym. Sci.*, Part A: *Polym. Chem.*, 27, 3521 (1989)], all incorporated by reference herein.

The microspheres of this invention, and water dispersible films made exclusively therefrom preferably comprise at least about 80 parts of at least one free radically polymerizable monomer, optionally up to about 5 parts of one or more polar monomers, about 0 to about 15 parts of at least one hydrophilizing component crosslinked with at least one multifunctional crosslinker. An additional initiator and/or other multifunctional crosslinker and other additives may also be used.

More preferably, the microspheres comprise about 95 to about 100 parts of free radically polymerizable monomer selected from the group consisting of alkyl acrylate esters, alkyl methacrylate esters, vinyl esters, and mixtures thereof, optionally about 0 to about 3 parts of at least one polar monomer, and optionally about 0 to about 2 parts of a hydrophilizing component. Most preferably the microspheres comprise about 97 to about 99.9 parts of free radically polymerizable monomer, about 0 to about 1.0 parts of a hydrophilizing component, and, optionally, about 0.1 to about 2.0 parts of a polar monomer.

Aqueous suspensions of hollow microspheres of the invention may be prepared by known "two-step" emulsification processes where the first step involves forming a water-in-oil emulsion of an aqueous solution with an oil phase of the free radically polymerizable monomer formed with an emulsifier having a low hydrophilic-lipophilic balance (HLB) value (i.e., less than 7.0) preferably 2 to 7.

Also included in the oil phase would be any free radical initiator, optional comonomers, the polar monomer, crosslinking monomers or oligomers, or conventional additives.

In the second step, a water-in-oil-in-water emulsion is formed by dispersing the water-in-oil emulsion from the first step into an aqueous phase containing an emulsifier having a HLB value of above 6. In both steps, when an emulsifier is utilized, its concentration should be greater than its critical micelle concentration, which is defined as the minimum concentration of emulsifier necessary for the formation of micelles, i.e., submicroscopic aggregations of emulsifier molecules. Critical micelle concentration is slightly different for each emulsifier, suitable concentrations ranging from about 1.0×104 to about 3.0 moles/liter.

The hydrophilizing component can be added to the oil or water phase in the first step or the water phase in the second step, either before or after polymerization is initiated, or some combination of these options.

Hollow microspheres which may contain polar monomer(s) may also be prepared by a "one-step" emulsification process comprising the aqueous suspension polymerization of the free radically polymerizable monomer(s), at least one hydrophilizing component, and, optionally, at least one polar monomer in the presence of at least one emulsifier capable of producing a water-in-oil emulsion or droplets inside the liquid phase, which droplets are substantially stable during emulsification and the subsequent polymerization. As in the two-step emulsification process, the emulsifier is utilized in concentrations greater than its critical micelle concentration.

Solid microspheres may be prepared by a "one-step" emulsification process comprising the aqueous suspension polymerization of the free radically polymerizable monomer(s), at least one hydrophilic component, an emulsifier or suspension stabilizers, optionally at least one polar monomer, oil soluble initiator(s), optionally crosslinkers, and other optional additives in an aqueous or other polar solution. Other methods to form microspheres include those described in patents such as U.S. Pat. Nos. 3,620,988; 4,166,152; 4,495,318; 4,598,112; 4,810,763; DE 3,544,882; 4,786,696 or 4,645,783. Emulsions or suspensions can be stabilized by polymeric stabilizers, include those described in U.S. Pat. No. 4,166,152 (Baker et al., including but not limited to casein, crosslinked polyacrylic acids, polyoxyethylene, polyacrylic acid, polymethacrylic acid, polyacrylamide, polyvinyl pyrrolidone, polyethylene amine, polyvinyl methyl ether, polyvinyl alcohol, salts thereof, and mixtures thereof) or the water soluble film forming polymer. Polymeric stabilizers or mechanical agitation can be used alone or in conjunction with ionic or nonionic surfactants or emulsifiers. Preferred are suspension polymerization processes using ionic or nonionic emulsifiers at a concentration greater than the critical micelle concentration.

In all of the above methods, all or part of the hydrophilizing component(s), and the polar monomer(s) can be added after the free radical monomer polymerization of the emulsion is initiated. This may be done provided that the withheld components are added to the polymerizing mixture prior to 100% conversion of the monomers to polymer.

Suitable initiators are those which are normally suitable for free radical polymerization of free radically polymerizable monomers and which are oil-soluble and of very low solubility in water. Examples of such initiators include but are not limited to those selected from the group consisting of thermally-activated initiators such as azo compounds, hydroperoxides, peroxides, and the like, and photoinitiators such as benzophenone, benzoin ethyl ether, and 2,2-dimethoxy-2-phenyl acetophenone, and the like, and mixtures thereof. Use of a water soluble polymerization initiator causes formation of substantial amounts of latex which is generally undesirable. The initiator is generally used in an amount ranging from about 0.01 percent up to about 10 percent by weight of the total polymerizable composition (i.e., monomers, hydrophilizing component, and initiator), preferably up to about 5 percent.

The composition from which the microspheres of the invention are made also contain a multifunctional crosslinking agent to render the microspheres water and solvent insoluble or infusable. The term "multifunctional" as used herein refers to crosslinking agents which possess two or more free radically polymerizable ethylenically unsaturated groups. Useful multifunctional crosslinking agents include those selected from the group consisting of acrylic or methacrylic esters of diols such as butanediol diacrylate, triols such as glycerol, and tetrols such as pentaerythritol. Other useful crosslinking agents include those selected from the group consisting of polymeric multifunctional (meth)acrylates, e.g., poly(ethylene oxide) diacrylate or poly(ethylene) oxide dimethacrylate; polyvinylic crosslinking agents, such as substituted and unsubstituted divinylbenzene; and difunctional urethane acrylates, such as Ebecryl™ 270 and Ebecryl™ 230 (1500 weight average molecular weight and 5000 weight average molecular weight acrylated urethanes, respectively—both available from Radcure Specialties), and mixtures thereof. When used, crosslinker(s) is(are) added at a level of up to about 10 equivalent weight % preferably up to about 5 equivalent weight %, of the total polymerizable composition. The "equivalent weight %" of a given compound is defined as the number of equivalents of that compound divided by the total number of equivalents in the total composition, wherein an equivalent is the number of grams divided by the equivalent weight. The equivalent weight is defined as the molecular weight divided by the number of polymerizable groups in the monomer (in the case of those monomers with only one polymerizable group, equivalent weight=molecular weight). The crosslinker can be added to any phase at any time before 100% conversion to polymer of the monomers of this microsphere composition. Preferably crosslinker is added before initiation occurs.

The microspheres of the invention are non-tacky, solvent and water insoluble but swellable in organic solvents, and small, typically having average diameters of at least about 1 micron, preferably in the range of about 1 to about 300 microns, and most preferable about 1 to 20 microns or blends of from 10 to 90 percent microspheres having diameters of from 1 to 10 microns with 90 to 10 percent microspheres having diameters of from 20 to 300 microns. The blends are preferred in providing improved elongation properties and associated increased packing efficiency. When the microspheres are hollow, the voids typically range in size from less than 1 micron up to about 100 microns or larger.

The microsphere can be formed into a water dispersible film by casting or coating the polymerized suspension by conventional techniques preferably within a solution of a water soluble polymer. The water soluble polymer is typically 0 to 95 weight percent of the dry film weight, preferably 0 to 75 weight percent and most preferably 10 to 50 weight percent. Exemplary water soluble polymers include polyvinyl alcohol, hydroxymethyl cellulose (Methocel™, Dow Chemical) hydroxypropyl cellulose (Klucel™, Aqualon, Inc.) carboxylated polyvinyl acetate (Daratek™ RP-200, W. R. Grace & Co.), poly(methyl vinyl ether-co-maleic anhydride) (Gantrez™, GAF Inc.) alignic acid derivatives (Algin™, Kelco, Inc.), polyethylene oxide, poly(n-vinyl pyrrolidone), polyethyleneglycol and polyacrylic acid or mixtures thereof. The preferred water soluble polymer is polyvinyl alcohol which typically is formed by partial hydrolysis of polyvinyl acetates. The solubility of the polyvinyl alcohol can be adjusted by the percent hydrolysis with the most soluble polymers having a degree of hydrolysis of from 79 to 95% preferably 85 to 90% with a molar vinyl acetate content of from 12 to 80 percent with the remainder being vinyl alcohol units. To obtain less soluble and hence more water resistant films the polyvinyl alcohol degree of hydrolysis can be adjusted as known in the art. The polyvinyl alcohol molecular weight is preferably from 10,000 to 200,000, more preferably 10,000 to 50,000.

The water soluble polymer improves the water dispersibility of films formed from microspheres without significant loss of the tensile properties and humidity resistance provided by films of the microspheres alone.

The water dispersible films or fibers have a diameter or thickness of preferably greater than 5 microns up to about 300 microns or more, however, thicker films or fibers are less water dispersible.

In a preferred embodiment the microspheres are formed in a water-in-oil-in-water or oil-in-water polymerization as described above where the continuous aqueous phase is a solution of the water soluble polymer (the continuous aqueous phase solution preferable comprises at least 2 percent polymer). This in-situ microsphere formation is particularly preferred with polyvinyl alcohol as the physical properties of the film formed from the microsphere/water soluble polymer suspension are improved relative to the water soluble polymer film or physical blends with microspheres, particularly at high temperature and humidity conditions. This is believed to be due to grafting of the microsphere free radically polymerizable monomers with the water soluble polyvinyl alcohol to form a limited degree of crosslinking between the matrix polyvinyl alcohol and the in-situ polymerized microspheres to modify the interface between the matrix point and the microspheres. Generally, the in-situ polymerization method also provides films that are more translucent and have better resistance to moisture, yet remain repulpable under standard repulping conditions.

The cast or coated films or fibers can also include minor proportions of fillers, such as calcium carbonate, silica flour, wood flour, silica alumina hydrate and the like in amounts up to 40 percent by weight.

Crosslinker for the water soluble polymer, such as polyvinyl alcohol, can also be added to the blend of microspheres and soluble polymer, suitable crosslinkers for polyvinyl alcohol would include glyoxal (Hoeschst), BTCA (1,4-butane tetracarboxylic acid), transesterification catalysts such as HCL, Sunreg™ 700 resins (Segua Inc), Becote™-20 (Magnesium Elektron, Ltd.) other conventional additives such as biocides, plasticizer, humectants or defoamers can also be used.

The aqueous suspensions of the water dispersible microspheres and water soluble polymer can be formed into fibers by conventional fiber spinning and flash spinning techniques.

The invention water and solvent insoluble microsphere films or fibers can be dispersed by conventional paper repulping techniques such as mechanical agitation in water, with heat, if desired. However, as the microspheres might soften and gain some tackiness if heated it is preferred to repulp most microsphere films near room temperature and at neutral pH.

The invention films can be used for packaging, envelope window inserts, tape backings, and the like, where conventional plastic films prevent recyclability of the paper products used in association with the conventional plastic films. Further the invention dispersible or repulpable microsphere films provide significantly greater water resistance than films formed from water soluble polymers alone. The films are also heat sealable. This is especially useful for packaging.

EXAMPLES

Example 1

The procedure below describes the preparation of plastic microspheres with an average nominal diameter of less than 5 microns having a composition of NEO9/AA/HDDA, 97/2/1:

The microspheres were prepared in a 1 liter indented flask. 4.2 g of a polar co-monomer acrylic acid (AA), 2.1 g of 1,6-hexane diol diacrylate crosslinker (HDDA), and 1.13 g of Lucidol™-70 (70% benzoyl peroxide) were dissolved in 203.7 g NEO-9 (vinyl neononanoate, Union Carbide). Separately 1 g of sodium dodecyl benzene sulfonate (Siponate™ DS-10) was dissolved in 390 g of deionized water. The NEO-9 mixture was then added to the surfactant solution, then emulsified using a Gifford Wood mixer until the droplet size was less than 5 microns (μm). The microsphere emulsion was then charged to a 1-liter indented resin flask, heated to 60° C., degassed with argon and allowed to react for 22 hours.

Films were prepared by casting into Teflon coated beds milled 380 microns deep followed by subsequent air drying. Films were conditioned for 48 hrs at 25° C. and 50% relative humidity (RH) or 24 hrs at 33° C. and 90% RH to determine resistance to humidity).

The NEO-9 microsphere films after drying were difficult but not impossible to re-disperse into water, as determined by shaking a sample of film with water in a small (20 ml) vial. Films were essentially impermeable to water, as shown in Table 4.

Counterexample 2

The procedure described in Example 1 was also used to prepare "rubbery" microspheres with a nominal diameter of less than 5 microns made from of 97/2/1 isooctylacrylate (IOA)/AA/HDDA. Films were prepared as in Example 1, and tensile properties given in Table 1. In the Tables, RH is Relative Humidity, modulus was measured according to ASTM D-638, yield was determined according to ASTM D-638 and tensile strength was determined according to ASTM D-638.

The procedure of ASTM D-638 was followed except that the samples were 0.5 inches 1.3 cm) wide and cut into rectangular strips; the gage length was 2 inches (51 cm); the films were conditioned as indicated in Table 1 and the speed of testing was 12 in./min (30.5 cm/min).

TABLE 1

| Sample | Condition °C./% RH | Modulus (MPa) | Yield Stress (MPa) | Yield Strain (%) | Tensile (MPa) | Elongation (%) |
|---|---|---|---|---|---|---|
| PVOH | 25/50 | 71.0 | 10.8 | 30 | 22.4 | 200 |
|  | 33/90 | 4.5 | NY* | NY* | 7.6 | 250 |
| KLUCEL ™ | 25/50 | 340.0 | 11.3 | 6.1 | 23.6 | 73 |
|  | 33/90 | 210.8 | 8.2 | 7.7 | 21.6 | 90 |
| Example 1 | 25/50 | 333.8 | NY* | NY* | 8.7 | 8.4 |
|  | 33/90 | 236.6 | NY* | NY* | 1.8 | 1.6 |
| Counter Example 2 | 25/50 | 0.5 | NY* | NY* | 0.2 | 60 |
|  | 33/90 | 0.5 | NY* | NY* | 0.2 | 60 |

*NY: No yield point observed

In Table 1, the films from Examples 1 and 2 are compared to water soluble polyvinyl alcohol (PVOH) and hydroxypropyl cellulose (KLUCEL™, Aqualon Inc.) films. The PVOH used was VINEX™ 2034 grade resin with a nominal 88% hydrolysis level from Air Products, Inc. The hydroxypropyl cellulose was KLUCEL™ Type G from Aqualon, Inc.

The films were on average 75 microns in thickness. Example 1 Neo-9 based microsphere films are plastic-like (high modulus, Tg>room temperature) under ambient conditions, but have low elongation. The Counterexample 2 non-tacky rubbery (IOA) microsphere films have poor tensile properties (low modulus, no yield point, low tensile strength and elongation). Neither microsphere film is affected much by humidity.

Conversely, the PVOH film becomes soft, sticky and rubbery when exposed to high humidity conditioning, transforming from a strong plastic to a soft, weak rubbery material. The KLUCEL™ film has good properties even when exposed to humidity, but becomes mottled (splotchy) in appearance. Neither the PVOH nor KLUCEL™ films exhibit good water resistance (see Table 4).

Example 3

The procedure described in Example 1 was used to prepare Neo-9 based microspheres which incorporated a water-dispersible and polymerizable macromer, CW-750 (polyethylene oxide acrylate). The composition prepared was 96/2/2/2, Neo-9/CW-750/AA/HDDA. The suspension was cast into a brittle, opaque film which was able to re-disperse into water. The film had relatively poor resistance to water as shown in Table 4. The microsphere average diameter was less than 5 microns.

Example 4

In this example a soluble polymeric binder was mixed with the microsphere suspensions (prepared according to Exs. 1∝3). Generally this gave films with better properties, processability and re-dispersibility in water (which affords good repulpability).

The water soluble polymers described in Table 1 were dissolved separately into deionized water at room temperature to give a solution of 5–25% solids. This aqueous solution was then mixed in the desired proportion with the microsphere suspensions described in Examples 1–3(E1, CE2 and E3, respectively). Films were cast by knife coating the mixture onto a siliconized liner, and the films dried 5–8 minutes at 80°C. Films were conditioned and tested as in Example 1. Tensile properties given in Table 2 were determined as in Table 1 above.

of example 1 Neo-9 microspheres with KLUCEL™ exhibit superior stiffness and yield properties, but inferior ultimate properties when compared to example 1 microspheres blended with PVOH. Blends of example 3 Neo-9 microspheres incorporating the PEO-acrylate and PVOH were surprisingly brittle and opaque. Blends substituting rubbery IOA-based microspheres (counterexample 2) for plastic Neo-9 microspheres were rubbery and soft with poor overall properties.

Examples 5 and 6

Microspheres can also be prepared in the presence of water soluble film forming polymers by an "in-situ" polymerization technique providing an in-situ blend. In this example plastic microspheres were prepared in the presence of a water soluble polymer. The microspheres have a composition of 97/2/1 NEO-9/AA/HDDA and an average microsphere particle size of about 3 microns.

In 130 g of liquid NEO-9 monomer at room temperature was dissolved 3.6 g AA, 1.8 g HDDA, and 0.9 g Lucidol™-70. In a separate flask, 45 g of the water soluble polymer (here, VINEX™ 2034 PVOH) was dissolved into 420 g of deionized water. The monomer solution was charged into the aqueous PVOH solution and the blend homogenized using a Gifford-Wood Model 1L homogenizer to obtain a fine emulsion of the monomer (about 3–5 micron average particle diameter). In this method, the soluble polymer (PVOH for example 5 and KLUCEL™ for example 6) acts as a stabilizer such that no additional surfactant is required. The emulsion was charged into a 1 liter baffled reactor fitted with a stirrer, thermometer and inert gas (argon) purge. The emulsion is allowed to react at 60° C. for 24 hours, with continuous stirring at about 400 rpm. After the polymerization reaction is complete, stable and creamy suspensions are obtained.

Films could have been formed from these suspensions by a variety of techniques, however, film casting was used due to the viscosity imparted by the soluble binder, which made this method particularly desirable. The films were conditioned and tested as in Example 1. Results are reported in Table 3 and compared with otherwise identical physical blends not formed by in-situ polymerization.

Example 7

In this example, an "in-situ" blend of 75/25 NEO9/PVOH was prepared as in Examples 5 and 6, only the NEO-9

TABLE 2

| SAMPLE | CONDITION °C./% RH | MODULUS (MPa) | YIELD STRESS (MPa) | YIELD STRAIN (%) | TENSILE (MPa) | ELONGATION (%) |
| --- | --- | --- | --- | --- | --- | --- |
| 50/50 E1/PVOH | 25/50 | 142.8 | 6.9 | 10.0 | 10.3 | 180 |
|  | 33/90 | 53.4 | 2.8 | 7.1 | 4.8 | 200 |
| 75/25 E1/PVOH | 25/50 | 202.1 | 8.4 | 10.9 | 9.7 | 160 |
|  | 33/90 | 115.9 | 5.2 | 8.4 | 6.4 | 65 |
| 75/25 CE2/PVOH | 25/50 | 7.0 | NY* | NY* | 3.4 | 76 |
|  | 33/90 | 3.0 | NY* | NY* | 2.1 | 92 |
| 75/25 E1/KLUCEL | 25/50 | 317.9 | 8.1 | 2.9 | 9.6 | 11.7 |
|  | 33/90 | 256.6 | NY* | NY* | 5.0 | 3.5 |
| 75/25 E3/PVOH | 25/50 | 204.8 | NY* | NY* | 5.4 | 3.6 |
|  | 33/90 | 101.4 | NY* | NY* | 3.8 | 7.2 |

*NY: No yield point observed

Physical blends of Example 1 or 3 Neo-9 microsphere films with PVOH have superior tensile properties than the comparable microsphere only films and much better humidity resistance than the PVOH film. The blend films retain a plastic character (high modulus, distinct yield point) after conditioning 24 hrs at 33° C. and 90% RH. Physical blends microsphere component had the composition 96/2/2/2 NEO-9/CW-750/AA/HDDA. The microspheres size was generally less than 5 microns as in example 1. The CW-750 macromer is useful in providing re-dispersibility to microspheres, but reduced film strength. A physical blend film made using Neo-9 microspheres containing CW-750 (from Example 3)

is chalky, brittle and opaque. In comparison, the corresponding "in-situ" blend is translucent, ductile, and significantly stronger. In addition, the "in-situ" film has significantly better water resistance, as shown in Table 4. The results for the Example 7 film and a comparable blend film are given in Table 3.

Example 8

In this example, an "in-situ" blend with PVOH was prepared as in Examples 5 and 6, only substituting the semi-crystalline monomer octadecyl acrylate (ODA) for NEO-9. The microspheres size was generally less than 5 microns as in example 1. In order to provide greater flexibility to the microspheres, vinyl acetate was copolymerized with the ODA. The final composition was 74/3/2/1/20 ODA/vinyl acetate/AA/HDDA/PVOH. The suspension was spun-cast under heating provided by infrared lamps in order to melt the predominantly semicrystalline ODA microspheres to permit film formation. The film was translucent and flexible, with low elongation. Dynamic mechanical analysis revealed a single sharp softening transition at about 46° C., ascribed to the melting of semicrystalline ODA microspheres. Properties are given in Table 3.

TABLE 3

| Sample | Condition °C./% RH | Modulus (MPa) | Yield Stress (MPa) | Yield Strain (%) | Tensile (MPa) | Elongation (%) |
| --- | --- | --- | --- | --- | --- | --- |
| Example 5 in-situ | 25/50 | 237.9 | 9.7 | 9.3 | 9.0 | 125 |
| | 33/90 | 146.9 | 7.0 | 10.2 | 7.2 | 60 |
| Example 5 Physical | 25/50 | 202.1 | 8.4 | 10.9 | 9.7 | 160 |
| | 33/90 | 115.9 | 5.2 | 8.5 | 6.4 | 65 |
| Example 7 in-situ | 25/50 | 147.6 | 6.9 | 13.2 | 8.6 | 183 |
| | 33/90 | 101.9 | 5.9 | 18.1 | 6.8 | 172 |
| Example 7* Physical | 25/50 | 204.8 | NY | NY | 5.4 | 3.6 |
| | 33/90 | 101.4 | NY | NY | 3.8 | 7.2 |
| Example 6 in-situ | 25/50 | 365.5 | 4.5 | 2.1 | 4.7 | 2.3 |
| | 33/90 | 231.0 | NY | NY | 1.6 | 1.9 |
| Example 6 Physical | 25/50 | 317.9 | 8.1 | 2.9 | 9.6 | 11.7 |
| | 33/90 | 256.6 | NY | NY | 5.0 | 3.5 |
| Example 8 | 25/50 | 209.7 | NY | NY | 3.2 | 2.4 |

*Prepared from Example 3

Comparisons of physical microsphere blends to "in-situ" microsphere blends are made in Table 3 comparing the example 5, 6 and 7 in-situ blend films to physical blend films. In all samples, the microspheres are 75 weight percent of the blend and the water soluble polymer is 25 weight percent of the blend. Films formed from the "in-situ" materials are translucent and ductile, even at the high (≈75%) microsphere content. Conversely, films formed from the equivalent physical blends typically exhibit diminished properties. The PVOH "in-situ" films have much better moisture resistance than PVOH films and are more easily repulped (and more easily re-disperse into water) than the microsphere films.

KLUCEL™-based blends (either "in-situ" or physical) were generally more stiff and brittle.

Example 9

In this example, an "in-situ" suspension blend was made according to Example 5 except that the microspheres were crosslinked using a trifunctional crosslinker, trimethylolpropane triacrylate (TMPTA), in place of the difunctional HDDA. The suspension was cast into a film, conditioned and tested as in Example 1. Tensile data is reported in Table 5 for this material.

Comparing the tensile properties for the Example 9 film to the comparable "in-situ" material made with difunctional HDDA (Example 5) shows that the Example 9 film is stiffer, with a higher yield strength and lower yield strain, better tensile strength and equivalent elongation. These property improvements are ascribed to a higher level of crosslinking conferred by the trifunctional TMPTA.

Example 10

In this example, an "in-situ" blend comprised of 75 parts NEO-9 microspheres of the composition 97/2/1 NEO-9/AA/HDDA, 20 parts of KLUCEL™ soluble polymer and 5 parts PVOH soluble polymer was prepared as below.

150 g KLUCEL™ Type G, 2.4 g Siponate™ DS-10, and 18.7 g PVOH (VINEX™ 2034) were dissolved in 1680 g deionized water. 8.6 g acrylic acid, 8.6 g HDDA, and 2.8 g Lucidol™-70 benzoyl peroxide were dissolved in 583 g NEO-9 liquid monomer. The aqueous solution of soluble polymers was added to the liquid monomer solution, and the blend homogenized for 30 minutes using a Gifford-Wood Model 1L homogenizer. The resulting emulsion was then charged to a 5 liter baffled reactor, heated to 60° C., degassed under argon and allowed to react for 22 hours. Following the polymerization, the resulting microsphere particle size was approximately 3 microns.

The microsphere suspension containing mixed soluble polymer binder was creamy and stable, showing that the "in-situ" method is not limited to use of a single binder. Combinations of binders may give desirable combinations of properties, for example good elongation and high viscosity to permit easy processing.

Example 11

In this example an "in-situ" blend of 75 parts NEO-9 microspheres, having a nominal diameter of 37 microns and a composition of 97.4/1.3/1.3 NEO9/AA/HDDA, and 25 parts PVOH was prepared as in Example 5, except that lower shear mixing was used in order to produce larger microspheres. Films were prepared, conditioned and tested as described in Example 1. The tensile properties are given in Table 5. The larger Example 11 microsphere based films exhibit lower stiffness, yield and tensile strength properties than films made with smaller microspheres.

Example 12

A 50/50 blend of the "in-situ" suspension microspheres from Example 9 (with TMPTA) and the larger "in-situ" suspension microspheres from Example 11 was cast into a film, conditioned and tested as before. The results are described in Table 5.

The Example 12 blend generally displays tensile properties intermediate to those of the Example 9 and 11 films of the two blend components. This means a variety of properties may be obtained for a given end use. In addition, the blend was stable (by visual inspection) indefinitely.

TABLE 4

| Sample | $t_b$ (sec./μm thickness) |
| --- | --- |
| PVOH | 0.216 sec/μm |
| KLUCEL ™ | 0.496 sec/μm |
| EXAMPLE 5 | 2.252 sec/μm |
| EXAMPLE 11 | 2.165 sec/μm |
| EXAMPLE 3/PVOH (75/25 Physical Blend) | 0.421 sec/μm |
| Example 7 (75/25 In-situ Blend) | 1.693 sec/μm |
| Example 1 | No Failure |

From Table 4, the water burst resistance ($t_b$: time to burst a measure of resistance to direct contact of water) for the "in-situ" films was at least 10 times greater than for neat PVOH film. Water Burst ($t_b$) was determines as follows:

A 32 mm diameter disk of material is die-cut from a sample and mounted to one end of a 25.4 mm internal diameter glass tube using waterproof silicone grease (Dow Corning High Vacuum grease). A plastic snap-cap with a 19 mm diameter hole punched out is fitted over the sample disk and tube end to provide a tight edge seal. The tube is inverted and filled with 10 ml of distilled water at room temperature. The time to the appearance of the first drop of water on the outer surface (i.e., that surface not in direct contact with the water) is denoted $t_b$, or water burst resistance time.

TABLE 5

| Sample | Condition °C./% RH | Modulus (MPa) | Yield Stress (MPa) | Yield Strain (%) | Tensile (MPa) | Elongation (%) |
| --- | --- | --- | --- | --- | --- | --- |
| Example 11 | 25/50 | 79.7 | 3.9 | 9.4 | 6.1 | 147 |
|  | 33/90 | 67.4 | 3.6 | 20.6 | 3.6 | 91 |
| Example 12 | 25/50 | 159.0 | 7.0 | 16.0 | 7.1 | 178 |
|  | 33/90 | 125.1 | 6.3 | 16.8 | 6.7 | 136 |
| Example 9 | 25/50 | 313.1 | 11.0 | 6.1 | 9.7 | 110 |
|  | 33/90 | 237.9 | 9.9 | 8.0 | 8.8 | 70 |

Example 13

A 1.8 mil thick VINEX™ 2034 grade PVOH film was overcoated with an isopropyl alcohol-based dispersion of NEO-9 minimicrospheres made by drying a 35% solids (in water) suspension of the microspheres (prepared according to Example 1) followed by cryogenic grinding to obtain a fine powder. This powder was then re-dispersed in warm (ca. 50° C.) ispropyl alcohol.

The coating was carried out using a 200 P (pyramidal) rotogravure roll (9.1 m/min) and drying at 120° C. The coating did not warp or shrink the PVOH substrate. By dynamic mechanical analysis, two distinct transitions corresponding to the two distinct layers are found. Water drops bead up on the coated surface and do not penetrate to the soluble PVOH beneath. The water and solvent insoluble microsphere coating protects the PVOH surface but still allows repulpability.

Example 14

A web of spun material was obtained from a 50/50 physical blend of NEO-9 minimicrospheres/PVOH as in Example 4. The suspension was placed in a cylindrical spin caster, and allowed to bleed from holes on the periphery of the caster while the cylinder was spun at ca. 5,000 rpm. The material spun outward to form a fine fiber which flash-dried under infrared lamps. The fibers thus obtained were composed of thin (0.5–1.0 μm) PVOH strands with intimately attached microspheres.

Example 15

A relatively thick (about 250–300 μm) sheet of 50/50 NEO-9/PVOH physical blend prepared according to Example 4 was mounted on a T.L. Long biaxial orienting machine fitted with an oven set at 65° C. The film was biaxially oriented at a 2:1 ratio in each main direction. From Table 8, orientation causes an increase in film modulus and tensile strength compared to an un-oriented sample. In addition, oriented films require a longer time to redisperse in water, but shrink by about 35% when conditioned at 33° C. and 90% RH.

TABLE 8

| Sample | Condition °C./% RH | Modulus (MPa) | Yield Stress (MPa) | Yield Strain (%) | Tensile (MPa) | Elongation (%) |
| --- | --- | --- | --- | --- | --- | --- |
| 50/50 CONTROL | 25/50 | 142.8 | 6.9 | 10.0 | 10.3 | 180 |
|  | 33/90 | 53.4 | 2.8 | 7.7 | 4.8 | 200 |
| 2:1 BIAX | 25/50 | 186.2 | 9.0 | 9.7 | 19.0 | 200 |
|  | 33/90 | 69.0 | 5.2 | 24.2 | 6.9 | 150 |

Comparative Examples

A series of filled PVOH films incorporating conventional inorganic or organic fillers was produced and compared to films using the invention microspheres.

The fillers used were:

Aerosil™ R-972 Fumed Silica (DeGussa, Inc.)

Technocel™ 30/20 Wood Flour

Akrochem™ S-100 Wood Flour

Spacerite™ S-11 Alumina Trihydrate (Alcoa)

Calcium Carbonate ($CaCO_3$)

Silica Flour

In all cases, the fillers were dispersed into a 20% aqueous solution of "VINEX" 2034 cold water soluble PVOH by ball milling. The final filler concentration was, in all cases, kept to 10 wt.%. Films were cast into milled (380 micron deep) "TEFLON" coated beds, dried, and conditioned as described in Example 1. The tensile properties were measured as in Example 1. The water burst resistance was measured as in the samples of Table 4.

Table 7 shows that some fillers (silica, wood flour) increase stiffness (modulus) slightly while others (R-972 fumed silica, alumina trihydrate, calcium carbonate) have little effect. When conditioned for 24 hrs at 33° C./90% RH all the films (with the exception of the wood flour filled sample) become soft and rubbery without a distinct plastic yield point. The wood flour filled sample exhibits slightly better humidity resistance than neat PVOH, but still significantly lower properties than the minimicrosphere/PVOH blends (see Tables 2 & 3). Fillers may be useful as stiffeners or extenders for repulpable films, but do not confer any meaningful improvement of mechanical properties.

TABLE 7

| Sample | Condition °C./% RH | Modulus (MPa) | Yield Stress (MPa) | Yield Strain (%) | Tensile Strength (MPa) | Elongation (%) | $t_b$ (S/μm) |
|---|---|---|---|---|---|---|---|
| PVOH | 25/50 | 71.0 | 10.8 | 30 | 22.4 | 200 | 0.216 |
| Control | 33/90 | 4.8 | NY | NY | 7.6 | 250 | |
| 10% CaCO$_3$ | 25/50 | 62.8 | 8.7 | 28 | 19.3 | 210 | 0.354 |
|  | 33/90 | 9.5 | NY | NY | 6.5 | 188 | |
| 10% Si Flour | 25/50 | 86.9 | 6.6 | 14 | 12.4 | 93 | 0.315 |
|  | 33/90 | 11.0 | NY | NY | 7.6 | 178 | |
| 10% Wood Flour | 25/50 | 145.5 | 12.1 | 17 | 15.9 | 73 | 0.670 |
|  | 33/90 | 24.1 | 3.4 | 20 | 7.3 | 80 | |
| 10% Al*3H$_2$O | 25/50 | 64.1 | 9.0 | 28 | 20.7 | 245 | 0.315 |
|  | 33/90 | 9.0 | NY | NY | 8.1 | 200 | |
| 10% R-972 Silica | 25/50 | 68.3 | 6.2 | 14 | 11.0 | 52 | 0.354 |
|  | 33/90 | 9.7 | NY | NY | 13.0 | 322 | |

The various modifications and alterations of this invention will be apparent to those skilled in the art without departing from the scope and spirit of this invention, and this invention should not be restricted to that set forth herein for illustrative purposes.

We claim:

1. A water dispersible fiber or film for use as an envelope window insert, tape backing said film or fiber comprising:
   (a) 0 to 95 parts of a water soluble film forming polymer, and
   (b) 5 to 100 parts of a non-tacky, water and solvent insoluble or infusible, film-forming, plastic, and polymeric microsphere having a diameter of at least 1 micron formed from free radically polymerizable monomers where components a) and b) are blended and formed into a water dispersible fiber or film having a tensile strength of at least 1.6 Mpa and said film being usable as an envelope window insert, tape backing.

2. The water dispersible film or fiber of claim 1 comprising 10 to 50 weight percent of the water soluble polymer which comprises polyvinyl alcohol, hydroxymethyl cellulose, hydroxypropyl cellulose, carboxylated polyvinyl acetate, poly(methyl vinyl ether-co-maleic anhydride), alginic acid derivatives, polyethylene oxide, poly(n-vinyl pyrrolidone), polyethylene glycol and polyacrylic acid or mixtures thereof.

3. The water dispersible film or fiber of claim 1 comprising 10 to 50 weight percent of the water soluble polymer which comprises polyvinyl alcohol polymer or copolymer of hydrolysed polyvinyl acetate having a degree of hydrolysis of from 79 to 95%.

4. The water dispersible film or fiber of claim 18 wherein the polyvinyl alcohol has a weight average molecular weight of from 10,000 to 200,000.

5. The water dispersible film or fiber of claim 2 wherein the water soluble polymer further includes a crosslinking agent therein.

6. The water dispersible film or fiber of claim 1 comprising a film having a thickness of less than 300 microns.

7. The water dispersible film or fiber of claim 1 further comprising 0 to 40 weight percent filler.

8. The water dispersible film or fiber of claim 1 wherein the microspheres have an average diameter of from 1 to 20 microns.

9. The water dispersible film or fiber of claim 1 wherein 10 to 90 percent of the microspheres have a diameter of from 1 to 10 microns and 90 to 10 percent of the microspheres have a diameters of from 20 to 300 microns.

10. The water dispersible film or fiber of claim 1 wherein the microspheres comprise the polymerization reaction product of:

(a) 70 to 100 parts of free radically polymerized monomers polymerizable to a polymer having a $T_g$, $T_m$ or softening point of at least 10° C.,
   (b) 0 to 5 parts of a polar monomer copolymerizable with the monomer of element (a),
   (c) 0 to 25 parts of a hydrophilizing agent,
   (d) 0.01 to 10 equivalent weight percent of a crosslinking agent based on the total polymerizable components (a)–(c).

11. The water dispersible film or fiber of claim 10 wherein the hydrophilizing agent comprises 0 to 15 parts of at least one free radically reactive oligomer or polymer.

12. The water dispersible film or fiber of claim 11 wherein the free radically reactive oligomer or polymer has a degree of polymerization of at least 2.

13. The water dispersible film or fiber of claim 12 wherein the free radically reactive oligomer or polymer is selected from the group consisting of p-vinyl benzyl terminated poly(n-vinyl pyrrolidone), p-vinyl benzyl terminated poly(acrylamide), methacrylate terminated poly(n-vinyl pyrrolidone), p-vinyl benzyl terminated poly(acrylamide), acrylate terminated poly(ethylene oxide), methacrylate terminated poly(ethylene oxide), methoxy poly(ethylene oxide) methacrylate, butoxy poly(ethylene oxide) methacrylate, p-vinyl benzyl terminated poly(ethylene oxide), acrylate terminated poly(ethylene glycol), methacrylate terminated poly(ethylene glycol), methoxy poly(ethylene glycol) methacrylate, butoxy poly(ethylene glycol) methacrylate, p-vinyl benzyl terminated poly(ethylene glycol), poly(ethylene oxide) diacrylate, poly(ethylene oxide) dimethacrylate, and mixture thereof.

14. The water dispersible film or fiber of claim 1 wherein the free radically polymerizable monomer comprises vinyl esters, alkyl acrylates, alkyl methacrylates, styrenes and substituted styrenes, cyclic alkyl acrylates and methacrylates, aryl acrylates and methacrylates, or mixtures thereof.

15. The water dispersible film or fiber of claim 14 wherein the free radically polymerizable monomer comprises vinyl neononanoate, vinyl pivalic acid ester, vinyl acetate, vinyl propionate, vinyl neodecanoate terbutyl acrylate, isobornyl acrylate, butyl methacrylate, acrylonitrile, isononal acrylate, isodecyl acrylate, isodecyl methacrylate, sec-butyl acrylate, isoamyl acrylate, 2-methylbutyl acrylate, 4-methyl- 2-pentyl acrylate, isodecyl acrylate, ethyl acrylate, styrenes or mixtures thereof.

16. The water dispersible film or fiber of claim 15 wherein the free radically polymerizable monomer further comprising free radically polymerizable comonomers of vinyl monomers copolymerized with the free radically polymerizable monomers.

17. The water dispersible film or fiber of claim 1 wherein the polar monomer is selected from the group consisting of acrylic acid, methacrylic acid, itaconic acid, crotonic acid, maleic acid, fumaric acid, sulfoethyl methacrylate, and ionic monomers such as sodium methacrylate, ammonium acrylate, sodium acrylate, trimethylamine p-vinyl benzimide, 4,4,9-trimethyl- 4-azonia-7-oxo-8-oxa-dec-9-ene-1-sulphonate, N,N-dimethyl-N-(beta-methacryloxy-ethyl) ammonium propionate betaine, trimethylamine methacrylimide, 1,1-dimethyl- 1-(2,3-dihydroxypropyl)amine methacrylimide, N-vinyl pyrrolidone, N-vinyl caprolactam, acrylamide, t-butyl acrylamide, dimethyl amino ethyl acrylamide, N-octyl acrylamide, and mixtures thereof.

18. The water dispersible film or fiber of claim 12 wherein the free radically reactive oligomer or polymer comprises poly(alkylene oxides), poly(vinyl methyl ether), poly(acrylamide), poly(n-vinylpyrrolidone), poly(vinyl alcohol), and mixtures thereof.

19. The water dispersible film or fiber of claim 11 comprising 80 to 100 parts of the free radically polymerizable monomer, 0 to 5 parts polar monomer, 0 to 15 parts of a hydrophilizing component wherein the crosslinking agent is a multifunctional crosslinker.

20. The water dispersible film or fiber of claim 19 comprising 95 to 100 parts of the free radically polymerizable monomer, 0 to 3 parts polar monomer and 0 to 2 parts free radically reactive hydrophilizing agent.

21. The water dispersible film or fiber of claim 11 comprising 97 to 99.9 parts of the free radically polymerizable monomer, 0.1 to 1.0 parts polar monomer and 0 to 1.0 parts free radically reactive hydrophilizing agent.

22. The water dispersible film or fiber of claim 18 wherein the multifunctional crosslinker comprises 0.01 to 5 equivalent weight percent based on the total polymerizable components (a)-(c) of acrylic or methacrylic esters of diols, triols, and tetrols; polymeric multifunctional (meth)acrylates; polyvinylic crosslinking agents; and difunctional urethane acrylates and mixtures thereof.

\* \* \* \* \*